United States Patent
Jersenius et al.

(10) Patent No.: US 11,412,537 B2
(45) Date of Patent: *Aug. 9, 2022

(54) INCLUDING IN THE UPLINK GRANT AN INDICATION OF SPECIFIC AMOUNT OF CQI TO BE REPORTED

(71) Applicant: IDTP HOLDINGS, INC., Wilmington, DE (US)

(72) Inventors: Kristina Jersenius, Linköping (SE); Eva Englund, Linköping (SE); Pal Frenger, Linköping (SE)

(73) Assignee: IDTP Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/601,691

(22) Filed: Oct. 15, 2019

(65) Prior Publication Data
US 2020/0045729 A1 Feb. 6, 2020

Related U.S. Application Data

(63) Continuation of application No. 15/385,425, filed on Dec. 20, 2016, now Pat. No. 10,506,628, which is a
(Continued)

(51) Int. Cl.
*H04W 4/00* (2018.01)
*H04B 17/00* (2015.01)
(Continued)

(52) U.S. Cl.
CPC ........ *H04W 72/1294* (2013.01); *H04B 17/24* (2015.01); *H04L 1/003* (2013.01);
(Continued)

(58) Field of Classification Search
CPC ......... H04W 72/1289; H04W 72/1278; H04W 72/1284; H04W 72/1294; H04W 88/02;
(Continued)

(56) References Cited

U.S. PATENT DOCUMENTS 6,747,968 B1 6/2004 Seppala et al.
6,983,149 B2 1/2006 Lindquist et al.
(Continued)

FOREIGN PATENT DOCUMENTS

EP 0936777 A1 8/1999
EP 1253796 A2 10/2002
(Continued)

OTHER PUBLICATIONS

3rd Generation Partnership Project (3GPP), R1-060155, "Scheduling and Multiplexing of CQI and ACK/NACK Feedback for Single Carrier FDMA in Evolved UTRA Uplink", InterDigital, 3GPP TSG-RAN WG1 WG1 LTE Ad Hoc Meeting, Helsinki, Finland, Jan. 23-25, 2006, 8 pages.
(Continued)

*Primary Examiner* — Yemane Mesfin
*Assistant Examiner* — Mon Cheri S Davenport
(74) *Attorney, Agent, or Firm* — Condo Roccia Koptiw LLP

(57) ABSTRACT

The present invention relates to a method, user equipment and a base station adapted to handle channel state feed-back reports in a more flexible way. More specifically, a channel state feedback procedure is provided which utilizes the resources available for transmission of channel state feedback more efficiently. This is achieved by including uplink grant availability into the channel state feedback reporting triggers used for determining when and how to send channel state feedback from a UE, i.e. a channel state feedback reporting request may be sent by a base station in an uplink grant to a UE comprising an indication of an expected amount of information to be returned.

12 Claims, 4 Drawing Sheets

Related U.S. Application Data continuation of application No. 14/528,298, filed on Oct. 30, 2014, now Pat. No. 9,564,978, which is a continuation of application No. 13/469,701, filed on May 11, 2012, now Pat. No. 8,902,775, which is a continuation of application No. 12/678,242, filed as application No. PCT/SE2007/051051 on Dec. 20, 2007, now Pat. No. 8,279,772.

(60) Provisional application No. 60/976,906, filed on Oct. 2, 2007.

(51) Int. Cl.
  *H04W 72/12* (2009.01)
  *H04L 1/00* (2006.01)
  *H04B 17/24* (2015.01)
  *H04W 88/02* (2009.01)
  *H04W 88/08* (2009.01)

(52) U.S. Cl.
  CPC .......... *H04L 1/0026* (2013.01); *H04L 1/0027* (2013.01); *H04W 72/1278* (2013.01); *H04W 72/1289* (2013.01); *H04W 72/1284* (2013.01); *H04W 88/02* (2013.01); *H04W 88/08* (2013.01)

(58) Field of Classification Search
  CPC ... H04W 88/08; H04W 72/048; H04W 24/00; H04W 24/08; H04W 28/0242; H04W 76/28; H04L 1/0026; H04L 1/0027; H04L 1/003; H04L 5/0046; H04L 5/0057; H04L 5/006; H04L 5/0078; H04L 5/0091; H04L 1/0003; H04L 47/24; H04L 47/2483; H04B 17/24; H04B 17/336
  See application file for complete search history.

(56) References Cited

U.S. PATENT DOCUMENTS

| | | | |
|---|---|---|---|
| 7,016,306 B2 | 3/2006 | Alapuranen et al. | |
| 7,161,914 B2 | 1/2007 | Shoaib et al. | |
| 7,221,929 B2 | 5/2007 | Lee et al. | |
| 7,437,154 B2 | 10/2008 | Hahn | |
| 7,551,576 B2 | 6/2009 | Ahmavaara | |
| 7,567,806 B2 | 7/2009 | Vare et al. | |
| 7,590,708 B2 | 9/2009 | Hsu | |
| 7,599,379 B2 | 10/2009 | Kelly et al. | |
| 7,835,742 B2 | 11/2010 | Jaakkola et al. | |
| 8,279,772 B2 | 10/2012 | Jersenius et al. | |
| 8,472,882 B2 | 6/2013 | Higuchi et al. | |
| 8,902,775 B2 | 12/2014 | Jersenius et al. | |
| 9,564,978 B2 * | 2/2017 | Jersenius | H04W 72/1278 |
| 10,506,628 B2 * | 12/2019 | Jersenius | H04W 72/1289 |
| 2002/0191703 A1 | 12/2002 | Ling et al. | |
| 2003/0022740 A1 | 1/2003 | You | |
| 2003/0144001 A1 | 7/2003 | Nakatsugawa et al. | |
| 2003/0147364 A1 | 8/2003 | Watanabe et al. | |
| 2003/0218995 A1 | 11/2003 | Kim et al. | |
| 2004/0152480 A1 | 8/2004 | Willars et al. | |
| 2004/0264414 A1 | 12/2004 | Dorenbosch | |
| 2005/0033846 A1 | 2/2005 | Sankaranarayan et al. | |
| 2005/0107085 A1 | 5/2005 | Ozluturk | |
| 2005/0136898 A1 | 6/2005 | Shaheen et al. | |
| 2005/0237963 A1 | 10/2005 | Storm | |
| 2006/0135169 A1 | 6/2006 | Sampath et al. | |
| 2007/0082699 A1 | 4/2007 | Karaoguz et al. | |
| 2008/0026744 A1 | 1/2008 | Frederiksen et al. | |
| 2008/0117867 A1 | 5/2008 | Yin et al. | |
| 2008/0287138 A1* | 11/2008 | Yoon | H04W 72/085 455/452.2 |
| 2016/0157121 A1 | 6/2016 | Aiba et al. | |

FOREIGN PATENT DOCUMENTS

| | | |
|---|---|---|
| EP | 1424862 A1 | 6/2004 |
| EP | 1564953 A2 | 8/2005 |
| GB | 2352586 A | 1/2001 |
| GB | 2390777 A | 1/2004 |
| JP | 2008-236431 A | 10/2008 |
| KR | 10-2002-0073997 A | 9/2002 |
| KR | 10-2005-0053869 A | 6/2005 |
| WO | 2005/027556 A1 | 3/2005 |
| WO | 2005/072073 A2 | 8/2005 |
| WO | 2005/089009 A1 | 9/2005 |
| WO | 2008/115110 A1 | 9/2008 |
| WO | 2009/031572 A1 | 3/2009 |

OTHER PUBLICATIONS

3rd Generation Partnership Project (3GPP), R1-061534, "E-UTRA Uplink and Downlink Control Signaling-Text Proposal", Intel, TSG-RAN WG1 #45, Shanghai, China, May 8-12, 2006, 3 pages.

3rd Generation Partnership Project (3GPP), R1-071524, "CQI Feedback Control and Content in E-UTRA", Panasonic, 3GPP TSG-RAN WG1 Meeting #48bis, St Julians, Malta, Mar. 26-30, 2007, 4 pages.

3rd Generation Partnership Project (3GPP), R1-071652, "Basic Method for CQI Feedback in E-UTRA", NTT DoCoMo, Fujitsu, Sharp, 3GPP TSG RAN WG1 Meeting #48bis, Mar. 26-30, 2007, 4 pages.

3rd Generation Partnership Project (3GPP), R1-073009, "Two-Layer CQI Scheme for Improved PUCCH Efficiency", Nokia Siemens Networks, Nokia, 3GPP TSG-RAN WG1 Meeting #49bis, Orlando, U.S.A., Jun. 25-29, 2007, 6 pages.

3rd Generation Partnership Project (3GPP), R1-073680, "CQI Trigger Mechanism", Nokia, Nokia Siemens Networks, 3GPP TSG-RAN WG1 Meeting #50, Athens, Greece, Aug. 20-24, 2007, 6 pages.

3rd Generation Partnership Project (3GPP), R1-073746, "On CQI Reporting", Ericsson, 3GPP TSG-RAN WG1 Meeting #50 Athens, Greece, Aug. 20-24, 2007, 4 pages, Aug. 20-24, 2007, 4 pages.

3rd Generation Partnership Project (3GPP), R1-073858, "Way Forward for CQI reporting", Ericsson, Alcatel-Lucent, CATT, Freescale Semiconductor, Huawei, Icera Semiconductor, Interdigital, IPWireless, LGE, Mitsubishi, Motorola, Nextwave, Nokia, Nokia Siemens Networks, Nortel, NTT DoCoMo, Panasonic, Philips, Qualcomm Europe, Samsung, Sharp, Tex, Aug. 20-24, 2007, 3 pages.

3rd Generation Partnership Project (3GPP), R1-074854, "Channel Feedback Format Selection", Ericsson, 3GPP TSG-RAN WG1 meeting #51, Korea, Nov. 5-9, 2007, 6 pages.

3rd Generation Partnership Project (3GPP), R2-062134, "Idle Gaps for Handover Measurements in E-UTRAN", Ericsson, 3GPP TSG-RAN WG2 (Radio) Meeting #54, Tallinn, Estonia, Aug. 28-Sep. 1, 2006, 5 pages.

3rd Generation Partnership Project (3GPP), R2-062359, "Measurement Gap Scheduling", Qualcomm Europe, 3GPP TSG-RAN WG2 #54, Tallinn, Estonia, Aug. 28-Sep. 1, 2006, pp. 1-3.

3rd Generation Partnership Project (3GPP), R2-062448, "Dynamic Control of CQI Reporting", BenQ Mobile, 3GPP TSG RAN WG2 #54, Tallinn, Estonia, Aug. 28-Sep. 1, 2006, 5 pages.

3rd Generation Partnership Project (3GPP), R3-060726, "eNodeB Measurement Reporting", Ericsson, Agenda Item: 12.15.5, 3GPP TSG RAN WG3, Meeting # 52, Shanghai, China, May 8-12, 2006, 3 pages.

3rd Generation Partnership Project (3GPP), TDOC R1-063509, "Overhead for Periodic and Triggered CQI Reporting", IPWireless, 3GPP TSG RAN WG1#47, Riga, Latvia, Nov. 6-10, 2006, 6 pages.

3rd Generation Partnership Project (3GPP), TR 23.882 V0.3.0, "Technical Specification Group Services and System Aspects, 3GPP System Architecture Evolution: Report on Technical Options and Conclusions (Release 7)", Jul. 2005, pp. 1-13.

3rd Generation Partnership Project (3GPP), TR 25.813 V1.0.1, "Technical Specification Group Radio Access Network, Evolved Universal Terrestrial Radio Access (E-UTRA) and Evolved Uni-

(56) References Cited

OTHER PUBLICATIONS versal Terrestrial Radio Access Network (E-UTRAN), Radio Interface Protocol Aspects (Release 7)", Jun. 2006, pp. 1-39.
3rd Generation Partnership Project (3GPP), TR 25.814 V7.0.0, "Technical Specification Group Radio Access Network, Physical Layer Aspects for Evolved Universal Terrestrial Radio Access (UTRA) (Release 7)", Jun. 2006, pp. 1-126.
3rd Generation Partnership Project (3GPP), TR 25.912 V0.0.4, "Technical Specification Group Radio Access Network, Feasibility Study for Evolved UTRA and UTRAN (Release 7)", Mar. 2006, pp. 1-13.
3rd Generation Partnership Project (3GPP), TR 25.913 V2.1.0, "Technical Specification Group Radio Access Network, Requirements for Evolved UTRA and UTRAN (Release 7)", May 2005, pp. 1-14.
3rd Generation Partnership Project (3GPP), TR R3.018 V0.5.0, "Technical Specification Group Radio Access Network, Evolved UTRA and UTRAN, Radio Access Architecture and Interfaces (Release 7)", Sep. 2006, pp. 1-94.
3rd Generation Partnership Project (3GPP), TS 23.234 V2.0.0, "Technical Specification Group Services and System Aspects, 3GPP System to Wireless Local Area Network (WLAN) Interworking, System Description (Release 6)", Sep. 2003, 68 pages.
3rd Generation Partnership Project (3GPP), TS 23.234 V6.2.0, "Technical Specification Group Services and System Aspects, 3GPP System to Wireless Local Area Network (WLAN) Interworking, System Description (Release 6)", Sep. 2004, 97 pages.
3rd Generation Partnership Project (3GPP), TS 25.215 V7.0.0, "Technical Specification Group Radio Access Network, Physical Layer-Measurements (FDD) (Release 7)", Mar. 2006, pp. 1-18.
3rd Generation Partnership Project (3GPP), TS 25.331 V4.11.0, "Technical Specification Group Radio Access Network, Radio Resource Control (RRC), Protocol Specification (Release 4)", Sep. 2003, 945 pages.
3rd Generation Partnership Project (3GPP), TS 25.331 V4.15.0, "Technical Specification Group Radio Access Network, Radio Resource Control (RRC), Protocol Specification (Release 4)", Jun. 2004, 953 pages.
3rd Generation Partnership Project (3GPP), TS 25.331 V5.10.0, "Technical Specification Group Radio Access Network, Radio Resource Control (RRC), Protocol Specification (Release 5)", Sep. 2004, 1047 pages.
3rd Generation Partnership Project (3GPP), TS 25.331 V5.6.0, "Technical Specification Group Radio Access Network, Radio Resource Control (RRC), Protocol Specification (Release 5)", Sep. 2003, 786 pages.
3rd Generation Partnership Project (3GPP), TS 25.331 V6.3.0, "Technical Specification Group Radio Access Network, Radio Resource Control (RRC), Protocol Specification (Release 6)", Sep. 2004, 1048 pages.
3rd Generation Partnership Project (3GPP), TS 44.060 V4.13.0, "Technical Specification Group GSM/EDGE Radio Access Network, General Packet Radio Service (GPRS), Mobile Station (MS)—Base Station System (BSS) interface, Radio Link Control/Medium Access Control (RLC/MAC) Protocol (Release 4)", Sep. 2003, 321 pages.
3rd Generation Partnership Project (3GPP), TS 44.060 V4.18.0, "Technical Specification Group GSM/EDGE Radio Access Network, General Packet Radio Service (GPRS), Mobile Station (MS)—Base Station System (BSS) interface, Radio Link Control/Medium Access Control (RLC/MAC) Protocol (Release 4)", Sep. 2004, 324 pages.
3rd Generation Partnership Project (3GPP), TS 44.060 V5.13.0, "Technical Specification Group GSM/EDGE Radio Access Network, General Packet Radio Service (GPRS), Mobile Station (MS)—Base Station System (BSS) Interface, Radio Link Control/Medium Access Control (RLC/MAC) Protocol (Release 5)", Sep. 2004, 345 pages.
3rd Generation Partnership Project (3GPP), TS 44.060 V5.8.0, "Technical Specification Group GSM/EDGE Radio Access Network, General Packet Radio Service (GPRS); Mobile Station (MS)—Base Station System (BSS) Interface, Radio Link Control/Medium Access Control (RLC/MAC) Protocol (Release 5)", Sep. 2003, 341 pages.
3rd Generation Partnership Project (3GPP), TS 44.060 V6.4.0, "Technical Specification Group GSM/EDGE Radio Access Network, General Packet Radio Service (GPRS); Mobile Station (MS)—Base Station System (BSS) Interface, Radio Link Control/Medium Access Control (RLC/MAC) Protocol (Release 6)", Sep. 2003, 354 pages.
3rd Generation Partnership Project (3GPP), TS 44.060 V6.9.0, "Technical Specification Group GSM/EDGE Radio Access Network, General Packet Radio Service (GPRS), Mobile Station (MS)—Base Station System (BSS) Interface, Radio Link Control/Medium Access Control (RLC/MAC) Protocol (Release 6)", Sep. 2004, 366 pages.
Fodor et al., "Performance Analysis of a Reuse Partitioning Technique for OFDM Based Evolved UTRA", Gabor Fodor, Ericsson Research, 2006, pp. 112-120.
ITU-R, "Spectra and Bandwidth of Emissions", Recommendation ITU-R SM.328-10, Question ITU-R 76/1, 1999, pp. 1-76.
ITU-R, "Unwanted Emissions in the Out-Of-Band Domain", Recommendation ITU-R SM.1541-3, Jan. 2011, 79 pages.
ITU-R, "Unwanted Emissions in the Out-Of-Band Domain", Recommendation ITU-R SM.1541-1, Question ITU-R 211/1, 2001-2002, pp. 1-78.
ITU-R, "Unwanted Emissions in the Spurious Domain", Recommendation ITU-R SM.329-10, Feb. 2003, 42 pages.
Ludwig et al. "An Evolved 3GPP QoS Concept", Institute of Electrical and Electronics Engineers (IEEE), Ludwig et al., 2006, pp. 388-392.
Nichols et al., "Definition of the Differentiated Services Field (DS Field) in the IPv4 and IPv6 Headers", Network Working Group, Request for Comments: 2474, Dec. 1998, pp. 1-20.

\* cited by examiner

INCLUDING IN THE UPLINK GRANT AN INDICATION OF SPECIFIC AMOUNT OF CQI TO BE REPORTED

CROSS REFERENCE TO RELATED APPLICATIONS

This application is a continuation of U.S. patent application Ser. No. 15/385,425, filed Dec. 20, 2016, which is a continuation of U.S. patent application Ser. No. 11/528,298, filed Oct. 30, 2014, which issued as U.S. Pat. No. 9,564,978 on Feb. 7, 2017, which is a continuation of U.S. patent application Ser. No. 13/469,701, filed May 11, 2012, which issued as U.S. Pat. No. 8,902,775 on Dec. 2, 2014, which is a continuation of U.S. patent application Ser. No. 12/678,242, filed Mar. 15, 2010, which issued as U.S. Pat. No. 8,279,772 on Oct. 2, 2012, which claims priority and benefit of International Application No. PCT/SE2007/051051, filed on Dec. 20, 2007, which claims priority and benefit of U.S. Provisional Application No. 60/976,906, filed Oct. 2, 2007, which are incorporated by reference as if fully set forth.

TECHNICAL FIELD

The present invention relates to a method and arrangement in a telecommunications system, in particular it relates to a method and arrangement for handling channel state feedback reports in a telecommunications system.

BACKGROUND

The work on standardization of the Long Term Evolution (LTE) concept is currently ongoing within the third generation partnership program (3GPP). The downlink in LTE is based on orthogonal frequency division multiplexing (OFDM) with channel dependent scheduling in both the time and frequency domains. The base station, denoted eNodeB (evolved NodeB) in 3GPP terminology, will transmit reference signals that the mobile stations, or user equipments (UEs), use to determine the downlink channel quality. The UEs will send Channel Quality Indication (CQI) reports back to the eNodeB that are used by a scheduler located in the eNodeB.

A conventional downlink scheduling concept may be described with stages 1:1-1:4, as illustrated in FIG. 1. A base station 100, which is referred to as an enhanced NodeB, or eNodeB in LTE, communicating with a UE 101, transmits reference signals to UE 101 in a first stage 1:1. The reference signals can be used by UE 101 to determine the present downlink channel quality.

After having determined the downlink channel quality on the basis of the received reference signals, UE 101 sends one or more channel state feedback reports, which in this context typically are represented by Channel Quality Indication (CQI) reports, back to eNodeB 100 in a second stage 1:2. In eNodeB 100, the content of the one or more CQI reports can be retrieved and used by a scheduler (not shown), to perform resource allocation. UE 101 is informed of the resource allocation in a next stage 1:3, which is followed by transmission of downlink data over the allocated resource, as indicated with a final stage 1:4.

In one embodiment proposed for the LTE, The UE will be capable of transmitting different types of CQI reports, such as full CQI reports, partial CQI reports, and differential CQI reports. Full CQI report covers the whole downlink transmission bandwidth but they may have different frequency resolution, they may be filtered and processed in different ways, and they may be encoded in different ways. Partial CQI reports cover only a part of the downlink transmission bandwidth. The covered part of a partial CQI reports may be a set of contiguous or a set of distributed resource blocks. A differential CQI report contains an encoded version of the update vector relative to a previous CQI report.

CQI reports may also differ in how they are transmitted. They could be transmitted on dedicated control channel resources, on a scheduled resource. CQI reports may occur at known time instances and use a fixed format or the occurrence and format may be more dynamic. In the latter case the MAC header needs to include information about how the CQI report was transmitted, or else the eNodeB must perform blind detection.

Furthermore, CQI reports used together with SISO, MISO, SIMO, or MIMO, transmission could also be different. For MIMO a CQI report may e.g. include pre-coding weights to be used by the eNodeB multiple antenna transmission scheme.

The details on the CQI reporting are still under discussion in 3GPP. One possible outcome is that the UE will have a set of rules that triggers CQI reports to be transmitted. Each CQI transmission trigger is then associated with a specific type of CQI report in such a way that when the triggering condition is true the UE transmits a CQI report of the associated type. This is similar to how compressed mode is parameterized in WCDMA. For WCDMA compressed mode, each UE is provided with a transmission gap pattern set (TGPS) consisting of transmission gap patterns (TGP) that each define a transmission gap of a configurable length that is used for a specific measurement purpose. The CQI reports could be specified in a similar way: Each UE has a CQI reporting trigger set (CRTS) consisting of CQI reporting triggers (CRT) that specify when a specific type of CQI report shall be transmitted.

FIG. 2 illustrates a table of a CQI trigger configuration for a UE, e.g. as described above. The table comprises a plurality of CQI reporting triggers, CRT 1-n, configured for the UE. Each CRT is associated with one of the CQI report types, CQI A-X. When for example the trigger criteria specified by CRT 1 is true, a report type defined by CQI A will be transmitted from the UE to an eNodeB, as indicated in the table.

A CQI reporting trigger may be expressed in terms of a logical expression involving timers, events, and conditions. A simple periodic CQI reporting trigger will just consist of a periodic timer and a rule that a certain CQI report shall be transmitted every time the timer expires. A simple event based CQI reporting trigger will state that a certain type of CQI report shall be transmitted every time the triggering event, such as a handover event, occurs. A condition that could be included in the decision to transmit a certain CQI report or not, is e.g. if the downlink activity is above a threshold. A CRT is thus an expression involving timers, events and conditions consisting of logical statements such as AND, OR, NOT, WHEN, and IF.

What types of CQI reports a UE shall use, and what conditions that triggers them to be transmitted, are typically setup by higher layer signalling such as RRC signalling. In addition to configuring rules defining when and how CQI reports shall be transmitted the eNodeB may also explicitly request CQI reports using RRC signalling.

The LTE uplink is based on single-carrier modulation and uses frequency and time division multiple access principles (FDMA and TDMA). The LTE uplink consists of the physical uplink control channel (PUCCH) and a shared data channel (PUSCH) that are mutually orthogonally frequency multiplexed. The single-carrier property of the LTE uplink makes it impossible for a UE to transmit on a physical control channel and a physical data channel in the same transmission-time-interval (TTI).

Hence if a UE is transmitting data on a physical data channel the control information that must be sent in the same TTI must also be sent on the physical data channel. The UE will use the physical control channel to transmit control signalling only in the case when the UE has no data transmission, and hence is not using the physical data channel.

There are at least three types of control signalling that may be sent in-band on the physical data channel in case the UE has uplink data to transmit:

HARQ (ACK/NACK) feedback for downlink data transmissions.

Scheduling requests.

CQI reports.

The current assumption in 3GPP regarding the HARQ feedback and the scheduling request is that the HARQ will consist of one bit per MIMO stream, while the scheduling request might consist of just a single bit, indicating if a UE has data it wants to transmit or not. The CQI reports on the other hand can be significantly larger. The amount of bits that can be spent on the CQI reporting may depend on a number of different criteria, such as: downlink transmission mode, e.g. SISO or MIMO; type of downlink traffic, e.g. VoIP or Web; downlink radio characteristics, e.g. coherence time and/or coherence bandwidth; current uplink load and/or current downlink activity. Furthermore, while the HARQ feedback and the scheduling request signaling are vital for the communication protocols to work at all, the CQI reports can be seen more as performance enhancing feature for the downlink.

The more uplink resources that are spent on CQI reports, the better link adaptation and scheduling decisions can be made, and the better the performance of the downlink may be achieved. As for signaling in general, there is, however, a trade-off between the amount of resources that are used for signaling and the amount of resources available for transmission of user plane data traffic. In current state-of-the-art it is known that it is beneficial to adapt the CQI reporting scheme to the conditions listed above.

A drawback with prior art CQI reporting mechanisms is, however, the lack of flexibility as to the use of available resources.

In order to fully support all possible CQI feedback schemes in all possible scenarios one would need to allocate an unreasonable amount of physical resources for uplink physical control signaling.

Even with a limited number of schemes applied, new feedback schemes are difficult to introduce, especially if they require that the uplink physical control channels need to be re-designed.

A further assumption in 3GFP regarding the CQI reporting on the physical uplink control channel is that a maximum of approximately 10 bits can be transmitted per UE and TTI. This number of bits leaves little space for fine granular CQI frequency domain information and MIMO information. On the physical data channel it will most likely be possible to transmit more bits, One possibility presented in [2] is to include information about availability of an uplink grant in the CQI reporting triggers.

Some CQI reports will then only be transmitted if the UE has a valid uplink grant and some CQI reports will only be transmitted when the UE does not have an uplink grant (assuming all other conditions included in the CRT are valid).

It will then be possible to define a low-resolution and a high-resolution type of CQI report and set up the pair of CQI reporting triggers in such a way that if there is an uplink grant then a high-resolution CQI report can be transmitted using the granted resource and otherwise the low-resolution CQI report is transmitted on the uplink physical control channel. An uplink grant typically consists of resource block allocation, transport format indication and new data indicator.

With the UL grant trigger it is possible to set up a rule stating that if the UE obtains a grant and it has no uplink data, a special format high-resolution CQI report shall be transmitted on the granted resource. A problem with this rule is that the eNodeB does not have any information about the UE buffer. When the eNodeB receives the UE data it does not know if the UE had data and that the reception hence contains both data and CQI or if the UE had no data and the reception contains only CQI. The eNodeB must therefore check both possibilities which require extra signaling. Another problem with this solution is that the eNodeB cannot request an extra large CQI report from the UE when the UE has data.

SUMMARY

The present invention aims at providing a solution that at least to a certain extent alleviates some of the problems indicated above.

It is therefore an object of the present invention to provide a channel state feedback procedure which efficiently utilizes the available resources for transmission of channel state feedback.

It is furthermore an object of the present invention to provide a radio network base station and a mobile terminal adapted for handling channel state feedback reports in a more flexible way.

At least one of the above objects is achieved with a method, mobile terminal, or base station according to the appended independent claims.

Further objects and advantages are evident from the dependent claims.

A first aspect of the present invention relates to a method in a base station comprising a scheduler for obtaining channel state feedback from a UE. The method comprises the steps of determining if channel state feedback is required and in case channel state feedback is required, also determining a channel state feedback type, out of a predefined set of channel state feedback types, the type defining a required amount of channel state feedback information. An uplink grant comprising a transport format indicating said channel state feedback type is then generated and provided to the UE in order to receive the required amount of channel state feedback on the granted resource.

In one embodiment of this aspect of the invention the amount represents a percentage of said granted resource.

In another embodiment of this aspect of the invention the predefined set of types includes at least a type 1 and a type 2 transport format.

In yet another embodiment of this aspect of the invention the type 2 transport format indicates a specific amount in the range of 95-100 percent of said resource to be used by said UE for transmitting said channel state feedback information.

A still further embodiment of this aspect of the invention involves that the channel state feedback comprises a CQI report.

A second aspect of the present invention relates to a method in a user equipment, UE, for providing channel state feedback from the UE to a base station. The method comprises determining whether the UE has received an uplink grant from the base station or not and in case the UE has received an uplink grant, determining an amount of channel state feedback information required by the base station via a transport format of the grant. The determined amount of channel state feedback information is then transmitted to the base station on the granted resource, or alternatively no channel state feedback information is provided in case the UE has not received an uplink grant.

In one embodiment of this aspect of the invention the transport format indicates one out of a predefined set of channel state feedback types, said type defining the required amount of channel state feedback information.

A third aspect of the present invention relates to a base station comprising a scheduler for obtaining channel state feedback from a user equipment, UE. The base station comprises:

a generating unit adapted to determine whether channel state feedback is required or not and adapted to select one out of a predefined set of channel state feedback types, the type defining a required amount of channel state feedback information, and to generate an uplink grant comprising a transport format indicating the type in case channel state feedback is required, a transmitting unit adapted to transmit the uplink grant to the UE, and a receiving unit adapted to receive channel state feedback in response to the transmitted uplink grant.

A fourth aspect of the present invention relates to a User Equipment, UE, for providing channel state feedback from the UE to a base station comprising:

a determining unit for determining whether the UE has received an uplink grant from the base station or not and for determining a transport format of that grant indicating one of a predefined set of channel state feedback types, the type defining an amount of channel state feedback information required by the base station, a transmitting unit for transmitting the amount of channel state feedback information to the base station on the granted resource in case the UE has received an uplink grant, or no channel state feedback information in case the UE has not received an uplink grant.

The present invention according to various aspects and embodiments thereof described herein as well as their equivalents provides that:
a) The eNodeB does not have to perform blind detection. b) The eNodeB can request an extra large CQI report also when the UE has data to transmit uplink.

The features described above in relation to the method according to the invention may, where applicable, also be implemented in an arrangement according to the invention with the same advantages as described in relation to the method.

It goes without saying that the above aspects of the invention may be combined in the same embodiment. In the following, preferred embodiments of the invention will be described with reference to the drawings.

ABBREVIATIONS

RBS=Radio Base Station
MIMO=Multiple Input Multiple Output
SISO=Single Input Single Output
FDD=Frequency Division Duplex
TDD=Time Division Duplex

DETAILED DESCRIPTION

Briefly described, the present invention involves a method, user equipment and a base station adapted to handle channel state feedback reports in a more flexible way. More specifically, a channel state feedback procedure is provided which utilizes the resources available for transmission of channel state feedback more efficiently. This is achieved by including uplink grant availability into the channel state feedback reporting triggers used for determining when and how to send channel state feedback from a UE, i.e. a channel state feedback reporting request may be sent by a base station in an uplink grant to a UE comprising an indication of an expected amount of information to be returned. Alternatively, uplink grant availability is configured to be the only trigger, specifying which type of channel state feedback report to transmit. By using an uplink grant, alone or in combination with other channel state feedback trigger criteria, a base station will also be able go get more out of using channel state feedback reports than what is possible with prior art solutions.

In the following exemplified embodiments, channel state feedback reports delivered from UEs will consequently be referred to as CQI reports and base stations will be referred to as enhanced LTE base stations, i.e. eNodeBs. Furthermore, the channel state feedback rules, specifying when to transmit a CQI report, which may be expressed in terms of a logical expression involving one or a combination of timers, events and/or conditions, will be referred to as CQI reporting triggers. It is, however, to be understood that the described embodiments may be applicable also for other comparable channel state feedback implementations.

Figures 1, 2:
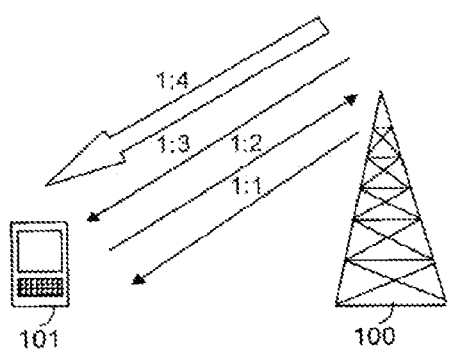
FIG. 1 is a basic overview of a conventional signaling procedure between user equipment and an eNodeB.
FIG. 2 is a table indicating a configuration of CQI report triggers.
Figure 3:
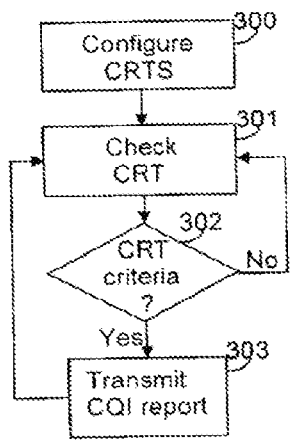
FIG. 3 is a flow chart illustrating a conventional procedure for providing a CQI report from user equipment to an eNodeB.

FIG. 3 is a simplified flow chart illustrating a conventional procedure for providing channel state feedback in the form of CQI reports from a UE to an eNodeB. In a first step 300, the criteria for when and how to deliver different types of CQI. reports, typically defined as specified above with reference to FIG. 2, configured as a CRTS by eNodeB, is delivered to and received by the UE. In a next step 301, a continuous checking procedure, for determining whether the CRT criteria specified by the CRTS is fulfilled, is initiated.

If the criteria of a CRT are found to be fulfilled in a step 302, a CQI report of the respective type will be transmitted by the UE, as illustrated with a final step 303. If, however, the CRT criteria are not fulfilled, the checking procedure is repeated starting again with step 301. If there is a plurality of different types of CQI reports configured for the UE, the checking procedure will be repeated accordingly for each report type.

Obviously, such a procedure for deciding when to transmit CQI reports leaves no room for flexibility as to the use of available resources or as to what information that can be retrieved from a CQI report.

In the following, preferred embodiments of the invention will be described.

According to the present invention, the eNodeB includes a specially adapted transport format, i.e. transport block size, modulation and/or coding rate, for the uplink transmission in the grant, i.e. resource allocation grant, to a UE. The solution according to the invention involves providing one or more transport formats specially arranged to indicate to the UE that CQI should be reported back to the eNodeB, and preferably arranged to indicate a specific amount of CQI to be reported back.

The eNodeB may request a CQI report by generating an uplink grant to the UE and include such a special transport format in the grant.

The UE may then use the granted resource only for transmitting channel state feedback such as a CQI report regardless if there is data to transmit or not. The eNodeB will thus know what type of transmission to expect and does not need to check both possibilities, i.e. both for channel state feedback information and for transmission data. This provides that so-called blind detection by the eNodeB can be avoided.

Further, as the eNodeB in this way has full knowledge of when the UE will transmit a CQI report it is possible to "puncture" in the CQI reports on granted resources, i.e. remove certain predetermined symbols from the data transmission and replace them with CQI information. A transport format could be defined to include a specified amount of CQI information (e.g. 5-10%) each time the UE is intended to transmit a CQI report, and no CQI information otherwise.

The amount of CQI information may be fixed or it may depend on the size of the uplink grant. In this scenario the eNodeB may assign a UE a grant with a special format containing a much larger amount of CQI information (e.g. 95-100%). At the reception of a grant of such a special transport format the UE shall always include the specified amount of CQI information, regardless if the conditions that normally triggers CQI report transmissions are true or not.

According to one embodiment of the present invention, the eNodeB may configure, through e.g. RRC (Radio Resource Control), the UE with a rule stating that if the UE receives an uplink grant with a special transport format indicating a 100% channel state feedback or "only CQI" the UE should use the granted resource for transmitting only CQI. This CQI report may have a special format where the size is linked to the resource allocation, Detailed frequency information and MIMO can be included since all of the granted resource is used for CQI.

Figure 4:
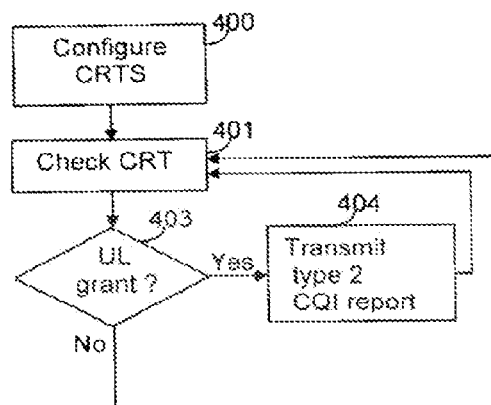
FIG. 4 is a flow chart illustrating a procedure for selecting a type of CQI report in user equipment as required by eNodeB, according to embodiments of the present invention.

FIG. 4 in a simplified flowchart illustrates a procedure according to embodiments of the present invention for providing a requested amount channel state feedback from a UE to an eNodeB. The first two steps 400, and 401 are executed in the same manner as described above, referring to FIG. 3. In a subsequent step 403, however, it is determined if the UE has received an uplink grant or not and it is further determined if the grant includes a transport format indicating a request for a certain amount of channel state feedback information to be returned to the eNodeB on the granted resource. For the sake of illustration only it is in this example assumed that the received grant includes a transport format indicating a type 2 channel state feedback, i.e. "only CQI" to be returned. Since the UE is preconfigured, e.g. through RRC signaling, with a rule stating that if a special transport format, i.e. a transport format indicating a certain amount of information to be returned (not limited to "only CQI" i.e. 95-100% CQI), is received any other conditions triggering CQI reports of certain types shall be overridden and a CQI of the requested size shall be transmitted on the granted resource. In this case the UE then in step 404 transmits only CQI in a type 2 CQI report on the allocated resource to the eNodeB even if there were data to transmit in the UE transmit buffer. The type 2 transport format included in the grant thus instructed the UE to utilize the whole capacity of the granted resource for channel state feedback information.

Alternatively no channel state feedback information is provided in case the UE has not received an uplink grant.

Figure 5:
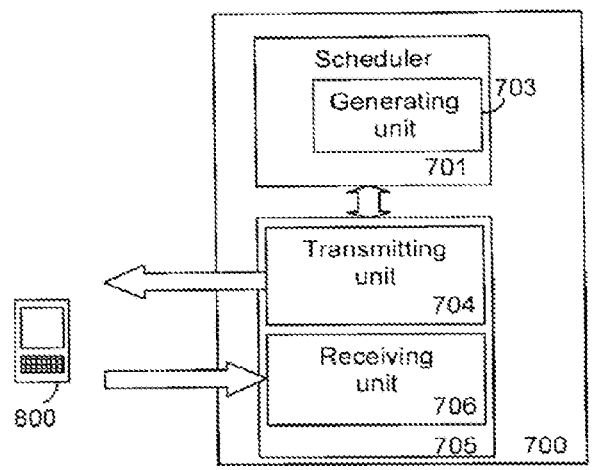
FIG. 5 is a block diagram, schematically illustrating an eNodeB, adapted to request for a CQI report, according to any of the described embodiments.

A simplified block diagram of a base station, exemplified as an eNodeB, adapted to operate in accordance with at least the embodiments described above, will now be described with reference to FIG. 5. It is to be understood that, for simplicity reasons, units which are not necessary for the understanding of the claimed invention have been omitted. It is also to be understood that all units mentioned in this document are to be interpreted as exemplified logical units, which may be implemented as single units of in combination with other units in any of various possible ways.

The eNodeB 700 comprises a scheduler 701, adapted to administrate scheduling between the eNodeB and one or more UEs, represented here by UE 800. The scheduler 701, which typically includes separate uplink and downlink scheduling functions (not shown), comprises a generating unit 703, adapted to determine whether channel state feedback information is required or not according to predetermined rules configured for the scheduler 701, to determine an amount of channel state feedback information required and to generate an uplink grant to be transmitted to the UE 800 when it is found that channel state feedback information is required comprising an indication of the required amount through a transport format of the grant.

The transport format of the grant indicates a channel state feedback type requested by the eNodeB. The eNodeB chooses a type of transport format out of a predefined set of transport format types stored therein accordingly, such as a type defining "only CQI", i.e. 100% or 95-100% CQI, or another type defining a lesser amount of CQI, for example 5-10% CQI or type 1 format. Through including an "only CQI" transport format, i.e. a type 2 transport format, in the grant, the eNodeB thus may request an extra large CQI report from the UE even when the UE has data to transmit. No UE transmit buffer data will in such case be transmitted on the granted resource as being essentially fully occupied with the channel state feedback transmission. If a transport format indicating a lesser amount of CQI to be reported, i.e. a type 1 format, is included in the grant also possible UE transmit buffer data will be transmitted on the granted UL resource with the requested CQI report.

The uplink grant generated by the scheduler 701 is transmitted to the respective UE via a transmitting unit 704 of a transceiver 705, and channel state feedback, which may be transmitted to the eNodeB 700 in response to the uplink grant, is received by a receiving unit 706 of the transceiver unit 705, Also rules for how to interpret the information retrieved from channel state feedback, or absence of expected channel state feedback, will be specified in the configuration of the scheduler.

Figure 6:
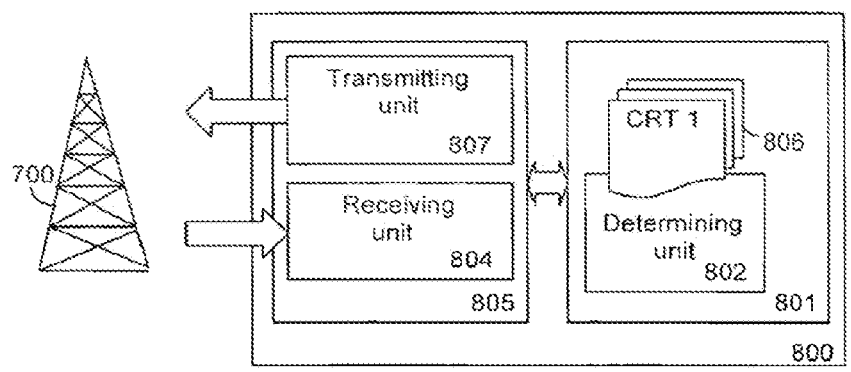
FIG. 6 is a block diagram, schematically illustrating a UE, adapted to provide a CQI report to a base station, according to any of the described embodiments.

A simplified block diagram of a UE, according to one embodiment, will now be described with reference to FIG. 6. Also in this figure, units and functions not necessary for the understanding of the claimed invention have been omitted. The UE 800 communicating with an eNodeB 700, comprises a generating unit 801 for generating a CQI report when the specified criteria is found to be valid, according to any of the embodiments described above. The generating unit 801 further comprises a determining unit 802, adapted to determine whether a respective CRT criteria is fulfilled or not, and, thus, whether a respective CQI report is to be transmitted or not. Obviously, the determining unit 802 is configured to determine whether an uplink grant has been received by the receiving unit 804 of a transceiver unit 805 of UE 800 and is present at the UE or not. The determining unit 802 also may determine whether the UE has uplink data to transmit or not and also determines an amount of channel state feedback information to transmit as required by the eNodeB via a transport format of the received grant indicating a channel state feedback type requested by the eNodeB. In addition, the determining unit may take the size of a received uplink grant into consideration when determining which version of channel state feedback information to transmit. The CQI reporting trigger criteria as well as a set of channel state feedback types indicative of different amounts of channel state feedback information, specified for the UE in one or more CRTs 806, is stored within, or in association with the generating unit 801. Once the availability of an uplink grant comprising a transport format indicating a required amount of channel state feedback information, and/or, if applicable, the validity of the remaining CRT criteria, has been determined by the determining unit 802, a CQI report of the required size is generated by the generating unit 801. The CQI report is then transmitted to the eNodeB 700 via a transmitting unit 807 of the transceiver unit 805 on the resource allocated in the grant.

Figure 7:
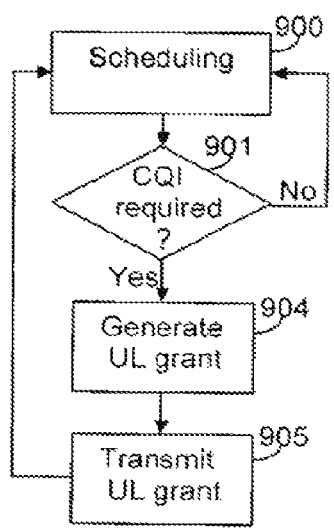
FIG. 7 is a flow chart illustrating a procedure for an eNodeB requesting a CQI report from a UE, according to one embodiment.

The operating steps of an eNodeB according to one embodiment will now be described with reference to FIG. 7, where scheduling is activated in a first step 900. When it is determined by the scheduler of eNodeB that a CQI report of a certain size, i.e. a certain channel state feedback type, is required in a next step 901, the scheduler generates an uplink grant indicating the required report size or type of channel state feedback through a transport format in a step 904, and transmits the uplink grant to the respective UE including the transport format in a final step 905.

The scheduling then proceeds accordingly, wherein the CQI report is awaited. In one alternative, the step 901 may be represented by checking the condition whether downlink data is present or not, i.e. if downlink data for the respective UE is present at the eNodeB, an uplink grant is generated in step 904 and transmitted in step 905, while no UL grant is transmitted otherwise.

The eNodeB has the knowledge when there is downlink data and when there is a need for detailed CQI reporting. The solution according to the present invention provides the eNodeB a possibility to request a CQI report. The advantages with this solution compared to existing solutions with uplink grant trigger and no data are that:
a) The eNodeB does not have to perform blind detection. b) The eNodeB can request an extra large CQI report also when the UE has data, Any examples and terminology relating to 3GPP LTE standard being used herein should not be seen as limiting the scope of the invention, the methodology of which in principle can be applied to any communication system.

The described subject matter is of course not limited to the above described and in the drawings shown embodiments, but can be modified within the scope of the enclosed claims.

Further, unless stated, none of the above embodiments are mutually exclusive. Thus, the present invention may include any combinations and/or integrations of the features of the various embodiments.

Additionally, while the processes described above and illustrated in the drawings are shown as a sequence of steps, this was done solely for the sake of illustration. Accordingly, it is contemplated that some steps may be added, some steps may be omitted, and the order of the steps may be rearranged.

REFERENCES

[1] H. Ekstrom (editor), "Long-term 3G Evolution Concept description," 2006 May 23.
[2] Pal Frenger and Eva Englund, Stefan Parkvall. Triggering Conditions of CQI Report Transmissions in LTE.

What is claimed is:

1. A method implemented by a user equipment (UE) for providing channel state feedback, the method comprising:
   receiving configuration information associated with a set of triggers;
   receiving a first uplink grant information indicating a first trigger from the set of triggers for sending a first channel state feedback report;
   generating the first channel state feedback report based on the first trigger having been indicated by the first uplink grant information, wherein the first channel state feedback report is associated with a first bandwidth;
   sending the first channel state feedback report;
   receiving a second uplink grant information indicating a second trigger from the set of triggers for sending a second channel state feedback report;
   generating the second channel state feedback report based on the second trigger having been indicated by the second uplink grant information, wherein the second channel state feedback report is associated with a second bandwidth, wherein the first bandwidth is different than the second bandwidth; and
   sending the second channel state feedback report.

2. The method of claim 1, wherein the first bandwidth or the second bandwidth corresponds to a portion of a downlink transmission bandwidth of the UE.

3. The method of claim 1, wherein the first channel state feedback report or the second channel state feedback report comprises at least a channel quality indication (CQI) report.

4. The method of claim 1, further comprising:
   receiving a third uplink grant information indicating a third trigger from the set of triggers for sending a third channel state feedback report;
   generating the third channel state feedback report based on the third trigger having been indicated by the third uplink grant information, wherein the third channel state feedback report is associated with a third bandwidth, wherein the third bandwidth is different than each of the first bandwidth and the second bandwidth; and
   sending the third channel state feedback report.

5. A user equipment (UE) comprising:
   a receiver configured to:
      receive configuration information associated with a set of triggers, and receive a first uplink grant information indicating a first trigger from the set of triggers for sending a first channel state feedback report;

a processor configured to generate the first channel state feedback report based on the first trigger having been indicated by the first uplink grant information, wherein the first channel state feedback report is associated with a first bandwidth;

a transmitter configured to send the first channel state feedback report;

the receiver configured to receive a second uplink grant information indicating a second trigger from the set of triggers for sending a second channel state feedback report;

the processor configured to generate the second channel state feedback report based on the second trigger having been indicated by the second uplink grant information, wherein the second channel state feedback report is associated with a second bandwidth, wherein the first bandwidth is different than the second bandwidth; and the transmitter configured to send the second channel state feedback report.

6. The UE of claim 5, wherein the first bandwidth or the second bandwidth corresponds to a portion of a downlink transmission bandwidth of the UE.

7. The UE of claim 5, wherein the first channel state feedback report or the second channel state feedback report comprises at least a channel quality indication (CQI) report.

8. The UE of claim 5, wherein the receiver is configured to receive a third uplink grant information indicating a third trigger from the set of triggers for sending a third channel state feedback report, wherein the processor is configured to generate the third channel state feedback report based on the third trigger having been indicated by the third uplink grant information, wherein the third channel state feedback report is associated with a third bandwidth, wherein the third bandwidth is different than each of the first bandwidth and the second bandwidth, and wherein the transmitter is configured to send the third channel state feedback report.

9. The method of claim 1, wherein the configuration information is received using a radio resource control (RRC) message.

10. The method of claim 1, wherein the first channel state feedback report comprises a first amount of feedback and the second channel state feedback report comprises a second amount of feedback, wherein the first amount of feedback is different than the second amount of feedback.

11. The UE of claim 5, wherein the configuration information is received using a radio resource control (RRC) message.

12. The UE of claim 5, wherein the first channel state feedback report comprises a first amount of feedback and the second channel state feedback report comprises a second amount of feedback, wherein the first amount of feedback is different than the second amount of feedback.

* * * * *

UNITED STATES PATENT AND TRADEMARK OFFICE
CERTIFICATE OF CORRECTION

PATENT NO. : 11,412,537 B2
APPLICATION NO. : 16/601691
DATED : August 9, 2022
INVENTOR(S) : Jersenius et al.

It is certified that error appears in the above-identified patent and that said Letters Patent is hereby corrected as shown below:

In the Specification

Column 1, Line 10: Delete "11/528,298," and insert -- 14/528,298, --

Column 1, Line 45: Delete "Abase" and insert -- A base --

Column 1, Line 64: Delete "full." and insert -- full --

Column 3, Line 63: Delete "bits," and insert -- bits. --

Column 6, Line 63: Delete "CQI." and insert -- CQI --

Column 7, Line 57: Delete "allocation," and insert -- allocation. --

Column 8, Line 67: Delete "705," and insert -- 705. --

Column 9, Line 65: Delete "data," and insert -- data. --

Signed and Sealed this
Fifth Day of September, 2023

Katherine Kelly Vidal
*Director of the United States Patent and Trademark Office*